UNITED STATES PATENT OFFICE.

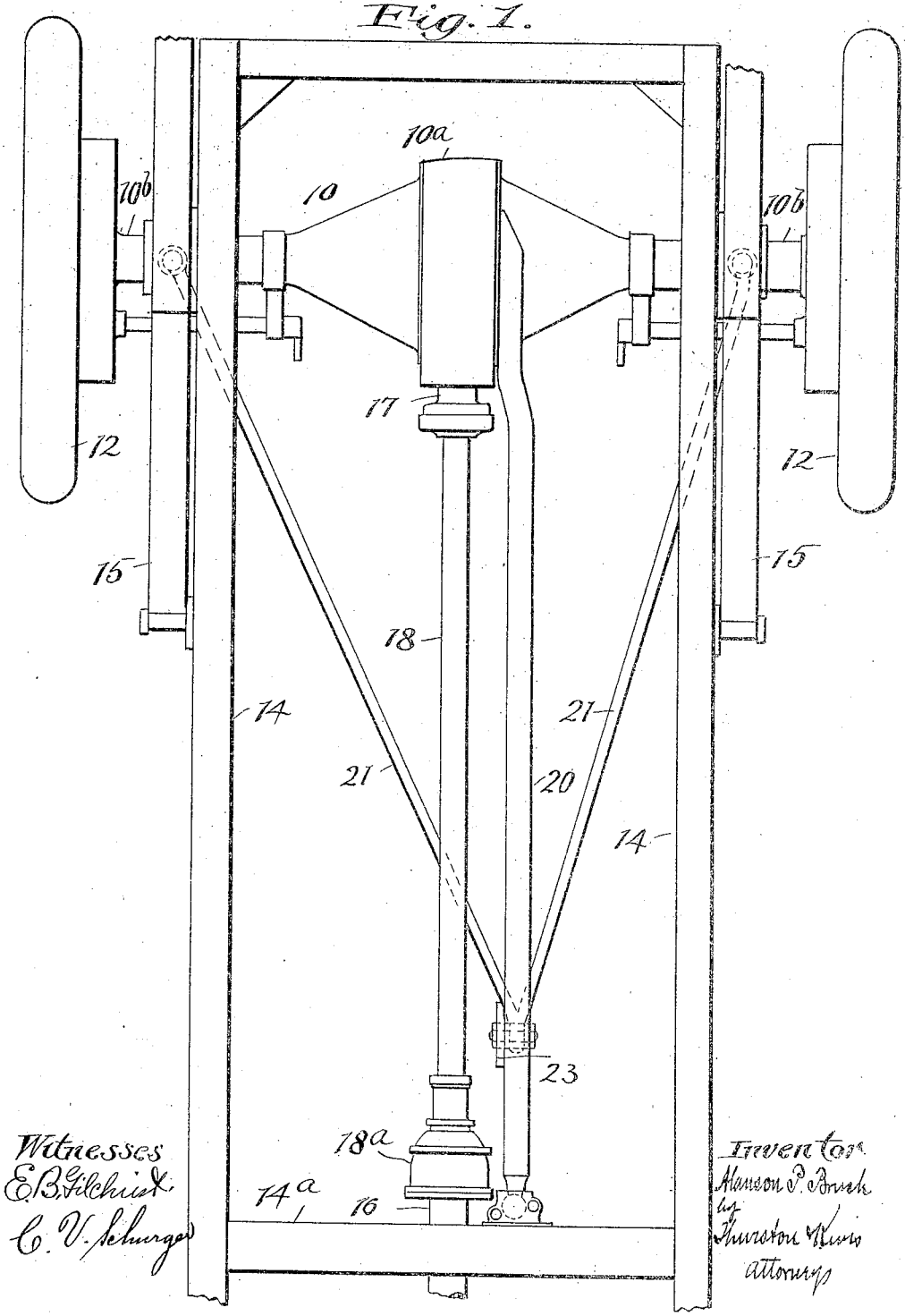

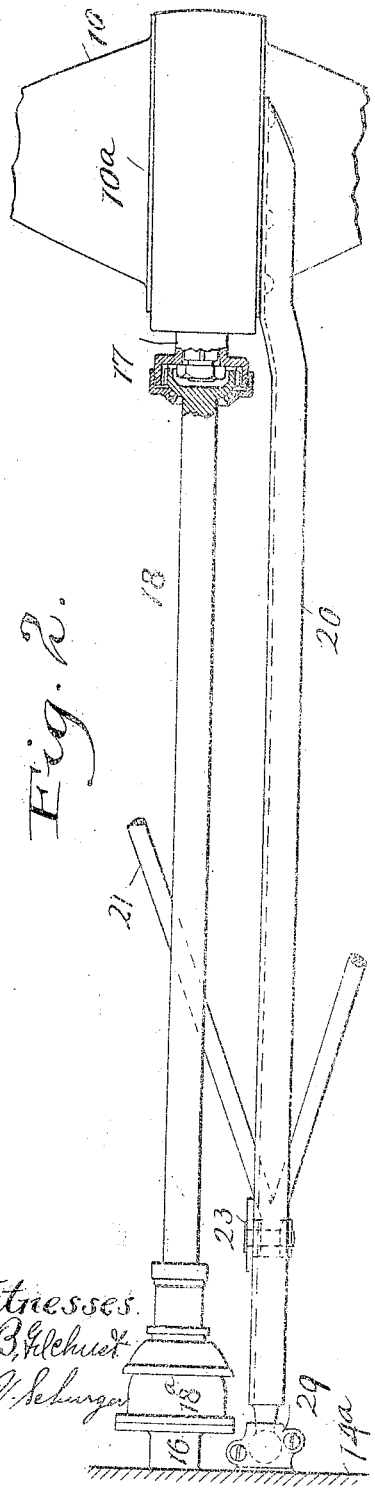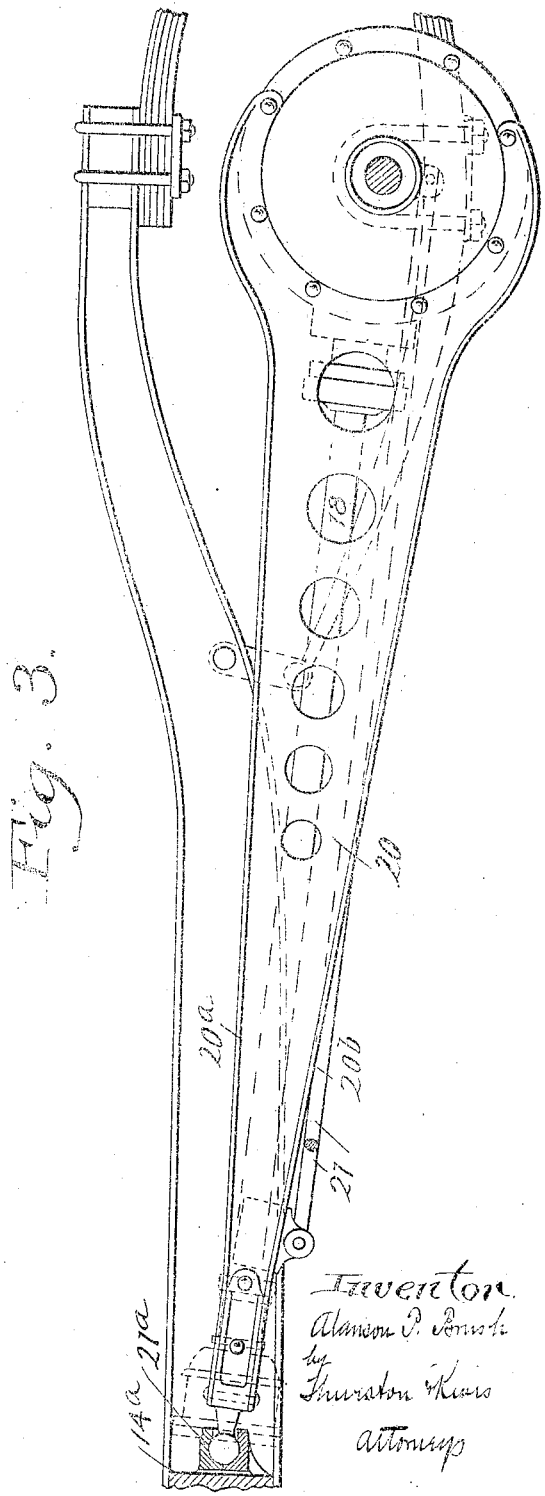

ALANSON P. BRUSH, OF DETROIT, MICHIGAN.

AUTOMOBILE CONSTRUCTION.

1,165,067.  Specification of Letters Patent. Patented Dec. 21, 1915.

Application filed February 1, 1915. Serial No. 5,420.

*To all whom it may concern:*

Be it known that I, ALANSON P. BRUSH, a citizen of the United States, residing at Detroit, in the county of Wayne and State of Michigan, have invented a certain new and useful Improvement in Automobile Construction, of which the following is a full, clear, and exact description.

This invention is an improvement in the construction of automobiles in which the rear end of the chassis frame is supported upon springs which are in turn connected to and supported by the rear axle frame member.

The object of the invention is to enable a single light and cheap member to serve as a driving strut and thereby to relieve the springs of the strain of propelling the chassis frame through them; to act as a torque member resisting the tendency of the rear axle frame member to turn; and to hold the rear axle in alinement,—functions which have not heretofore been performed in an equally satisfactory degree except by using two or more members.

The object of this invention is to provide the described connections between the rear axle and the chassis frame in a cheap but practically efficient form.

The invention consists in the construction and combination of parts shown in the drawing and hereinafter described and pointed out definitely in the appended claims.

In the drawing Figure 1 is a plan view which shows so much of the motor car as concerns the present invention; Fig. 2 is an enlarged plan view, partly sectioned, of certain parts of said mechanism; and Fig. 3 is a sectional side elevation of the parts which are shown in Fig. 2.

Referring to the parts by reference characters, 10 represents a so-called shaft-driven rear axle of conventional form. Its hollow frame member has an enlarged middle part $10^a$ which serves as a housing for the usual differential mechanism; and it has also two laterally extended tubes $10^b$.

12 represents the driving wheels which may be mounted in any suitable manner directly on these tubes $10^b$, or secured to live axle sections which pass through and are mounted in said tubes.

14 represents the chassis frame, which may be connected in the usual way with the rear axle tubes $10^b$ by springs 15 of any suitable sort.

16 represents the terminal shaft of the transmission mechanism which is rotatably mounted on the chassis frame.

17 represents the front end of the driving shaft of the rear axle mechanism.

All of the parts above named are, or may be, of known form, and may be operatively connected with one another in any of the usual ways employed for such purpose.

18 represents the propeller shaft by which power is transmitted from shaft 16 to shaft 17. It is essential that the rear end of this propeller shaft shall have a power transmitting universal joint connection with shaft 17. It is likewise essential that the front end of the propeller shaft shall have a power transmitting universal joint connection with the rear end of the shaft 16. What particular form of universal joint connections shall be employed is not at all material to the present invention, a great variety of such forms being well known in this art.

20 represents the torque member. It is preferably a pressed steel member having a forked rear end which partially embraces, and is bolted to the enlarged middle part $10^a$ of the rear axle frame member. From this point it extends forward, and its front end is connected with a cross-member $14^a$ of the chassis frame by a ball and socket joint 21 of such form that this torque member may either push or pull the frame member $14^a$ according as the driving wheels are turning forward or backward.

The ball and socket joint 21, which in a suitable form is indicated by 21 in Fig. 3, should be located in substantially the same horizontal plane with the universal joint $18^a$, by means of which the propeller shaft 18 is connected with the shaft 16.

21 are braces which are connected at their front ends with the torque member 20 and at their rear ends are connected with the tubular axle members $10^b$, adjacent to the ends of the latter.

The torque member 20 is preferably strengthened by laterally extended flanges $20^a$, $20^b$, along its top and bottom edges. The male member of the ball and socket joint 21 is riveted to the front end of the torque member between the two flanges $20^a$ and $20^b$. The bracket plate 23 may be also riveted to this torque member near its front end; and to the downwardly projecting part of this bracket the front ends of the braces 21 may be connected by a bolt. This torque member furnishes a single point drive by which the forward and backward impulse of the rear axle is imparted to the chassis frame. It is slightly offset with respect to the shafts 16, but is thoroughly practical and effective nevertheless.

The chief merit of the described construction is its cheapness taken in connection with the fact that it is thoroughly practical and efficient for the stated purpose. It has a much desired degree of flexibility. It permits the chassis frame to have the required up and down movement relation to the rear axle, but such movement does not in any degree impair the efficiency of the propeller shaft to perform its functions, nor of the torque rod to perform its correlated function.

Having thus described my invention, what I claim is:—

1. In a motor vehicle the combination of a hollow rear axle frame member, a chassis frame, springs intermediate of these two members by which the latter is connected to and supported by the former, the forwardly projecting driving shaft of the differential mechanism in the rear axle frame member, the rearwardly projecting terminal shaft of the transmission mechanism mounted on the chassis frame, a propeller shaft having a universal driving connection at its ends respectively with said terminal shaft of transmission mechanism and driving shaft of the differential mechanism, and a torque member which is rigidly connected at its rear end with the rear axle structure and which has a single point ball and socket connection with a member of the chassis frame.

2. In a motor vehicle the combination of a hollow rear axle frame member, a chassis frame, springs intermediate of these two members by which the latter is connected to and supported by the former, the forwardly projecting driving shaft of the differential mechanism in the rear axle frame member, the rearwardly projecting terminal shaft of the transmission mechanism mounted on the chassis frame, a propeller shaft having a universal driving connection at its ends respectively with said terminal shaft of transmission mechanism and driving shaft of the differential mechanism, a torque member which is rigidly connected at its rear end with the rear axle structure and which has a single point ball and socket connection with a member of the chassis frame, which ball and socket connection is located to one side of, but close to, and in substantially the same horizontal plane as the connection between the propeller shaft and transmission shaft.

3. In a motor vehicle the combination of a hollow rear axle frame member, a chassis frame, springs intermediate of these two members by which the latter is connected to and supported by the former, the forwardly projecting driving shaft of the differential mechanism in the rear axle frame member, the rearwardly projecting terminal shaft of the transmission mechanism mounted on the chassis frame, a propeller shaft having a universal driving connection at its ends respectively with said terminal shaft of transmission mechanism and driving shaft of the differential mechanism, and a torque member which has a forked rear end which partially embraces and is rigidly fixed to the rear axle frame member and which has a ball and socket connection between its front end and a cross member of the chassis frame.

4. In a motor vehicle the combination of a hollow rear axle frame member, a chassis frame, springs intermediate of these two members by which the latter is connected to and supported by the former, the forwardly projecting driving shaft of the differential mechanism in the rear axle frame member, the rearwardly projecting terminal shaft of the transmission mechanism mounted on the chassis frame, a propeller shaft having a universal driving connection at its ends respectively with said terminal shaft of transmission mechanism and driving shaft of the differential mechanism, a torque member which is rigidly connected at its rear end with the rear axle structure and which has a single point ball and socket connection with a member of the chassis frame, a bracket fixed to and projecting downward from said torque member near its front end, and two brace rods which are connected at their front ends to said bracket, and which diverge rearwardly therefrom and pass under the propeller shaft and are connected at their rear ends with the rear axle frame member near the ends of the latter.

In testimony whereof, I hereunto affix my signature in the presence of two witnesses.

ALANSON P. BRUSH.

Witnesses:
E. L. THURSTON,
C. V. SCHURGER.